United States Patent
Howard et al.

(10) Patent No.: US 6,678,615 B2
(45) Date of Patent: Jan. 13, 2004

(54) SYSTEM AND METHOD FOR PERFORMING FLOOD ZONE CERTIFICATIONS

(75) Inventors: John Willard Howard, North Richland Hills, TX (US); Dan Martin Scott, Irving, TX (US); Darin Wayne Higgins, Forth Worth, TX (US)

(73) Assignee: SourceProse Corporation, Watauga, TX (US)

( * ) Notice: Subject to any disclaimer, the term of this patent is extended or adjusted under 35 U.S.C. 154(b) by 0 days.

(21) Appl. No.: 10/127,511

(22) Filed: Apr. 23, 2002

(65) Prior Publication Data

US 2003/0009287 A1 Jan. 9, 2003

(Under 37 CFR 1.47)

Related U.S. Application Data

(63) Continuation-in-part of application No. 09/537,161, filed on Mar. 29, 2000.

(51) Int. Cl.⁷ .................................. G01V 3/38
(52) U.S. Cl. ........................... 702/5; 701/200
(58) Field of Search .............. 702/5, 34, 104, 702/1, 3; 701/200, 208; 395/135

(56) References Cited

U.S. PATENT DOCUMENTS

| | | | |
|---|---|---|---|
| 4,885,706 A | 12/1989 | Pate et al. | 364/551.01 |
| 5,247,356 A | 9/1993 | Ciampa | 358/109 |
| 5,414,462 A | 5/1995 | Veatch | 348/135 |

(List continued on next page.)

FOREIGN PATENT DOCUMENTS

| | | |
|---|---|---|
| EP | 0 454 129 A2 | 10/1991 |
| EP | 0 619 554 A2 | 10/1994 |
| WO | WO 90/14627 | 11/1990 |
| WO | WO 97/49027 | 12/1997 |

OTHER PUBLICATIONS

Li et al., "Accuracy Assessment of Mapping Products Produced from the Star–3i Airborne IFSAR System".

(List continued on next page.)

*Primary Examiner*—John Barlow
*Assistant Examiner*—Victor J. Taylor
(74) *Attorney, Agent, or Firm*—Finnegan, Henderson, Farabow, Garrett & Dunner, L.L.P.

(57) ABSTRACT

A method, system and apparatus for evaluating a characteristic or trait present at a geographic location in a plurality of non-georeferenced maps. In operation, the method comprises constructing a virtual bounding box around each inset of the maps, and then defining a virtual rectangular geographic grid system covering the total area covered by the maps. For each grid rectangle that intersects an inset bounding box, tracing the inset enclosed by the bounding box to determine if there is intersection of the grid rectangle and the inset. If there is intersection of a grid rectangle and an inset, adding the identity of the inset to a list associated with the grid rectangle, geocoding the location of the geographic location, and examining the insets contained in the list associated with the one grid rectangle containing the geocoded location, and performing the evaluation.

21 Claims, 7 Drawing Sheets

U.S. PATENT DOCUMENTS

| | | | |
|---|---|---|---|
| 5,422,989 A | 6/1995 | Bell et al. | 395/133 |
| 5,467,271 A | 11/1995 | Abel et al. | 364/420 |
| 5,487,139 A | 1/1996 | Saylor et al. | 395/135 |
| 5,592,375 A | 1/1997 | Salmon et al. | 395/207 |
| 5,596,494 A | 1/1997 | Kuo | 364/420 |
| 5,699,244 A | 12/1997 | Clark, Jr. et al. | 364/420 |
| 5,842,148 A | 11/1998 | Prendergast et al. | 702/34 |
| 5,848,373 A | 12/1998 | DeLorme et al. | 701/200 |
| 5,884,216 A | 3/1999 | Shah et al. | 701/207 |
| 5,902,347 A | 5/1999 | Backman et al. | 701/200 |
| 5,904,727 A | 5/1999 | Prabhakaran | 701/208 |
| 6,032,157 A | 2/2000 | Tamano et al. | 707/104 |
| 6,084,989 A | 7/2000 | Eppler | 382/293 |
| 6,377,278 B1 | 4/2002 | Curtright et al. | 345/634 |
| 6,504,571 B1 | 1/2003 | Narayanaswami et al. | 348/231.99 |

OTHER PUBLICATIONS

Fukunaga et al., "Image Registration Using an Image Graph and its Application to Map Matching," IEE Proceedings–E, vol. 138, No. 2, Mar. 1991.

Wang, "Integrating GIS's and Remote Sensing Image Analysis Systems by Unifying Knowledge Representation Schemes," IEEE Transactions on Geoscience and Remote Sensing, vol. 29, No. 4, p. 656–664, Jul. 1991.

Roux, "Automatic Registration of Spot Images and Digitized Maps," IEEE, p. 625–628, 1996.

SYSTEM AND METHOD FOR PERFORMING FLOOD ZONE CERTIFICATIONS

CROSS-REFERENCE TO RELATED APPLICATIONS

This application Is a continuation-in-part ("CIP") of and claims priority based on pending U.S. Patent Application entitled "System and Method for Performing Flood Zone Certifications," Ser. No. 09/537,161, filed Mar. 29, 2000. Furthermore, this application is related to commonly assigned, U.S. Patent Applications entitled "System and Method for Georeferencing Digital Raster Maps," Ser. No. 091537,849, filed Mar. 29, 2000; "System and Method for Georeferencing Maps," a continuation-in-part of the '849 application, Ser. No. 10/127,648, filed Apr. 22, 2000; "System and Method for Synchronizing Raster and Vector Map Images," Ser. No. 091537,162, filed Mar. 29, 2000; and "System and Method for Synchronizing Raster and Vector Map Images," a continuation-in-part of the '162 application, Ser. No. 10/127,115, filed Apr. 22, 2002; all of the foregoing being incorporated hereinto by reference.

FIELD OF THE INVENTION

The present Invention generally relates to the analysis of geographic features and characteristics, and, in particular, to a system and method for performing flood zone determinations.

BACKGROUND OF THE INVENTION

FEMA Flood Maps

The Federal Emergency Management Agency (FEMA) publishes a large set of "flood maps." These paper maps are the official, Federally sanctioned source for determining flood risk. The flood maps delineate regions that are assigned a flood zone designation from among a limited set of possible designations.

For example, a region designated "Zone A" on a flood map is a high risk area, which FEMA believes has at least a 1 in 30 chance of flooding during any given year. A region designated "Zone V" combines the properties of a "Zone A" with the additional risk of wave action or flowing water. Other zone designations include "X," "AE," "B," "C," and "D," see FIG. 2. In the foregoing context, performing a "flood zone determination" (also known as a "flood hazard determination" or a "flood certification") relative to a location entails a two-step process: (1) determining, based on FEMA flood maps and other materials, the FEMA-designated flood zone for the location in question, and, then, (2) completing required paperwork to report this determination (along with certain other required information) to interested parties, such as home buyers, their lenders, and real estate brokers.

Figure 3:
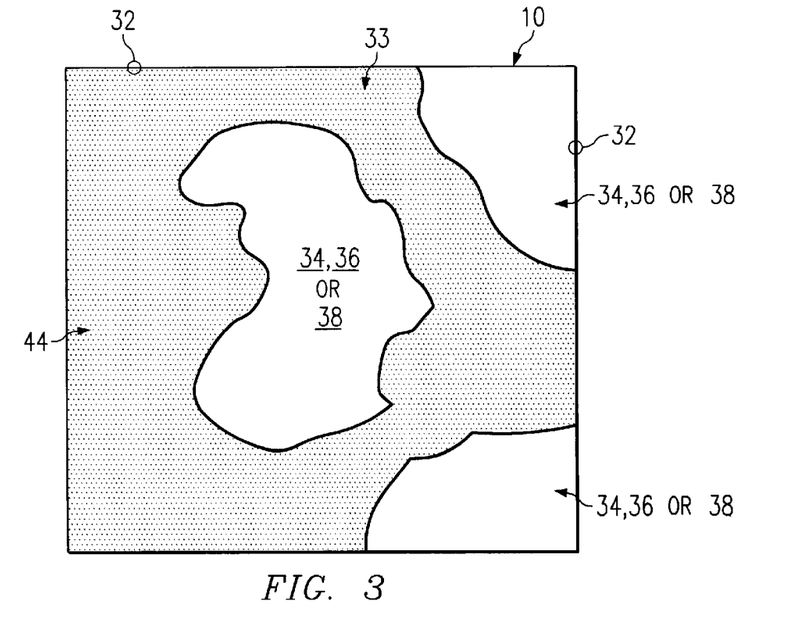
Figure 4:
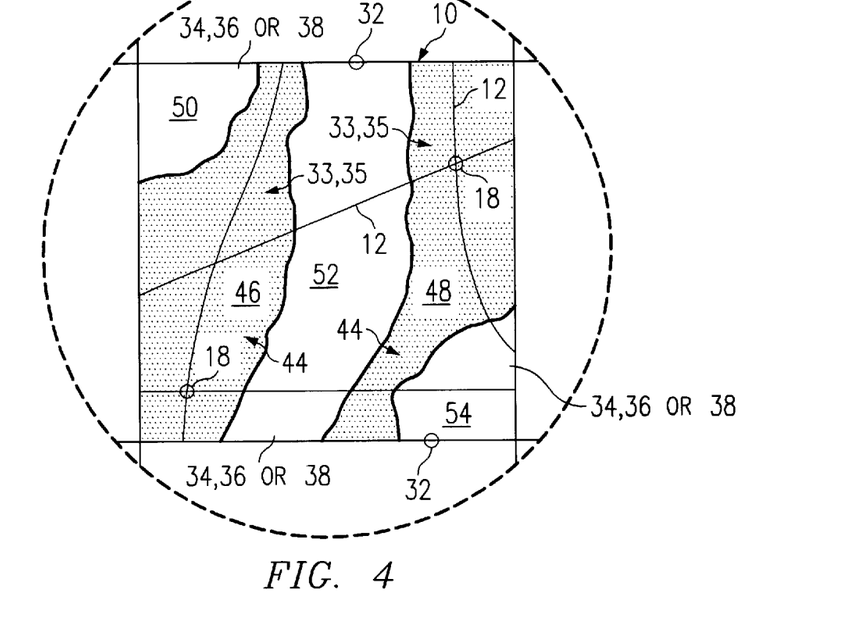
Figure 5:
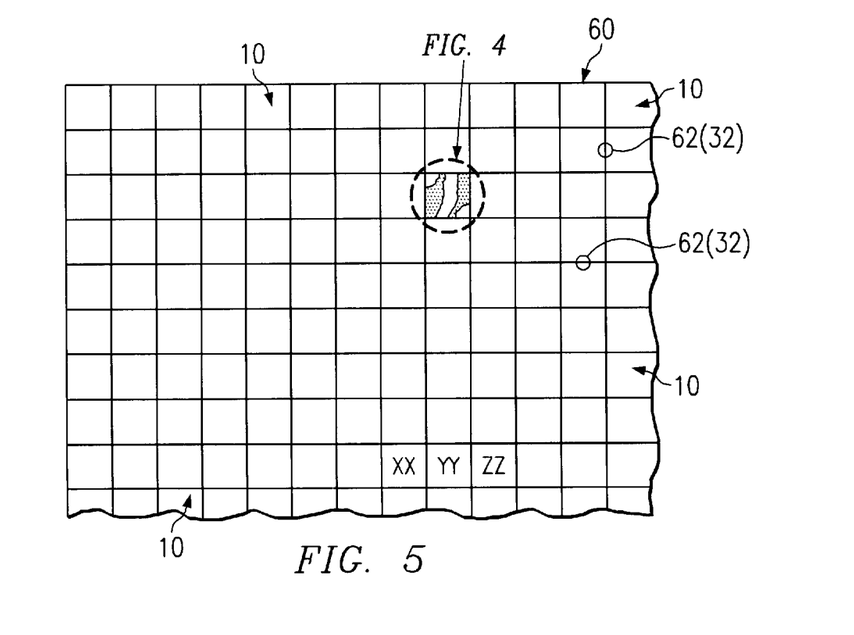
FIG. 5 is a stylized depiction of a FEMA index map.
Figure 6:
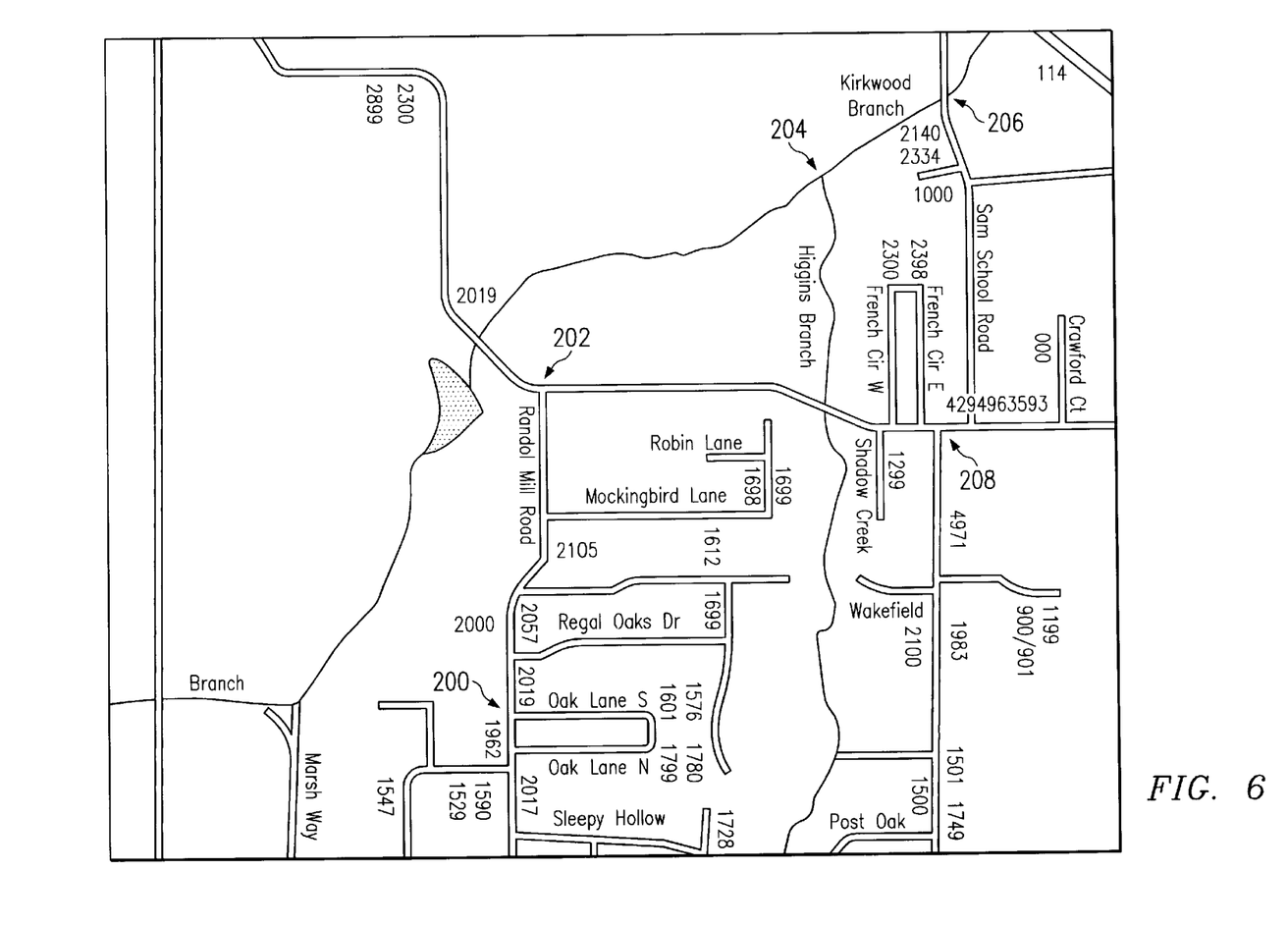
FIG. 6 is a reproduction of a portion of a vector map showing the same geographic area as FIG. 2.

FEMA flood maps come in a variety of styles, but broadly speaking they can be divided into two types of maps, namely, index panels or index panel maps, see FIG. 5, and regular panels or regular panel maps, see FIGS. 1–4 and 7.

Figure 1:
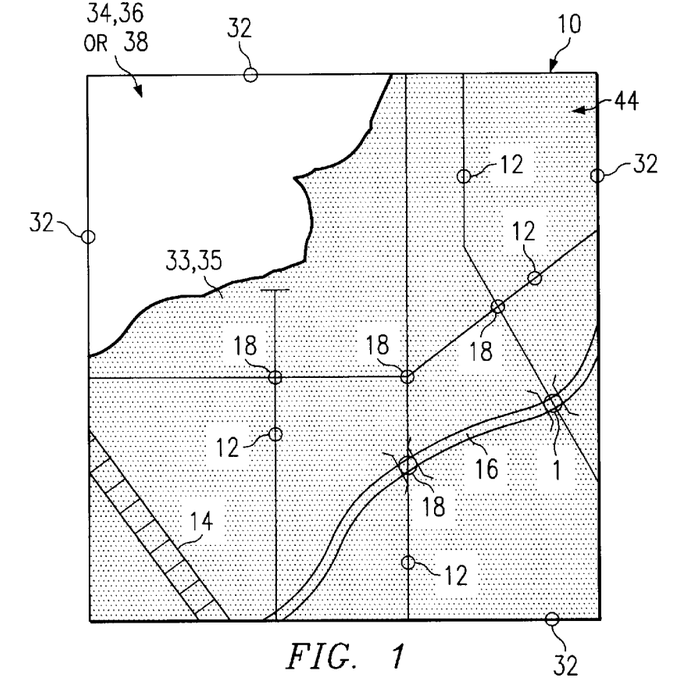
FIGS. 1, 3, 4 and 7 are stylized representations of initially non-georeferenced FEMA raster panel maps.

Referring to FIG. 1, a regular panel map 10 shows a relatively small geographic area at a fairly high level of detail. Each regular panel 10 depicts various "features" of the relevant area. These features include (without limitation) streets 12 railroad tracks 14, streambeds 16, lakes, intersections 18 of the foregoing, and detailed delineations of the boundaries of various extant flood zones 22(see FIG. 2) and their classifications.

Figure 2:
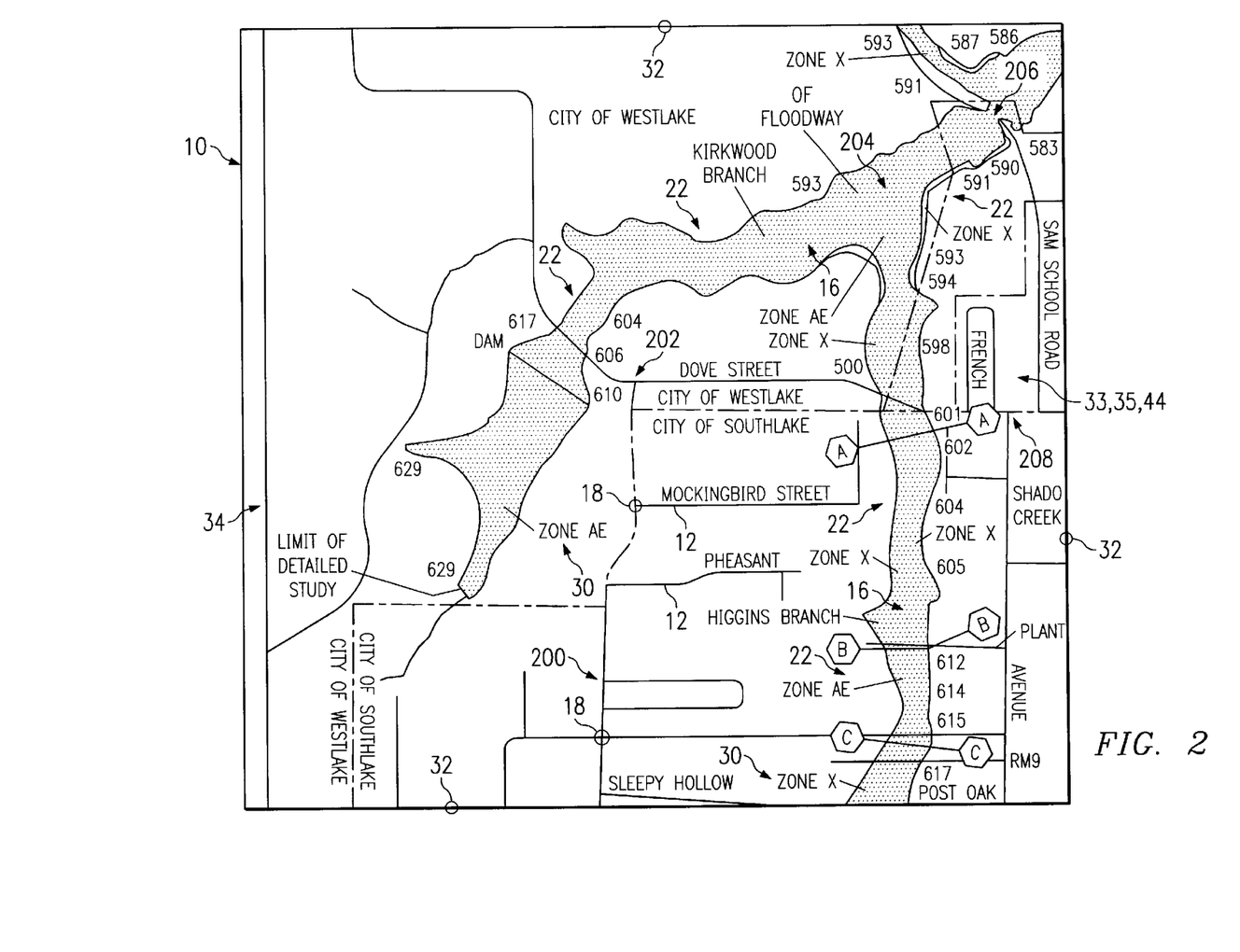
FIG. 2 is a reproduction of an initially non-georeferenced FEMA raster panel map.

FIG. 2 depicts a regular panel map 10 in which flood zones 22 are depicted. As is typical, the flood zones 22 are denoted or "flagged" as variously shaded regions contained within irregular curvilinear boundaries (the "rood zone boundary"). Legends or labels 30 on regular panels 10 designate the types of flood zones 22 that have been shaded. With the exception of regular panels 10 described as "not printed" ("PNP") and panels presenting flood zone-designated communities, described in greater detail below, all flood zone determinations are made by reference to appropriate regular panel maps 10.

Continuing to refer to FIGS. 1 and 2, each regular panel map 10 is bounded by a "neatline," that is, a rectangular frame or border 32 surrounding the geographic area 33 of interest. The geographic area of interest 33 may not completely "fill" the neatline 32, as indicated at 34 in FIGS. 1 and 2. For example, the actual geographic area 33 contained within the neatline 32 of a regular panel 10 might consist of (a) a portion 35 of a community and the designated flood classification of the portion and (b) unincorporated or other portions 36 which surround, are surrounded by, or abut the community, and which have no flood classification depicted on the panel 10.

Referring to FIG. 3, if FEMA has designated a regular panel map 10 as being applicable to determining the flood zone classification of only a portion 35 of an incorporated community, then the regular panel 10 cannot be used to determine the flood classification of any depicted unincorporated areas 38. According to FEMA protocol, the foregoing obtains whether or not flood zones for the unincorporated area are shown on the regular panel 10. Indeed, a FEMA panel map 10 often does not show flood zones for areas outside of the designated region for the map 10 (the designated region 35 is a portion of the community in this example). Sometimes the area outside of the designated area is just shown as a blank area on the panel, as at 38. Regardless of how much or how little detail is shown, by convention, a flood determination can be made using a panel 10 only in the region designated by FEMA.

The "inset" 44 of a panel 10 is any geographic region that is both shown on the panel 10 and as to which FEMA mandates the application of the flood zone designations set forth on the panel 10. A panel inset 44 may be self-connected (connected with all parts of itself) as in FIGS. 1–3, or, as shown in FIG. 4, it may comprise two or more self-connected regions 46,48 separated by one or more intervening, non-designated areas 60 on the panel 10 and may include other non-designated areas, such as those shown at 52 and 54. The inset 44 of a panel map 10 may comprise a collection of disjoint, self-connected regions 46, 48 which collectively contain all of the designated area of the panel 10, and themselves constitute a subset of the geographic region contained within the neatines 32.

Thus, from the foregoing, an actual map panel 10 consists in general, of three parts: (1) the inset(s) 44, (2) other (non-designated) geographic regions 34,36,38,50,52,54 within the neatlines 32, which are not included within the inset(s) 44, and (3) areas of the panel which are outside of the neatlines 32, and generally show various types of textual information such as a map legend, the map panel number, and panel effective date, etc. It is true that, In the ideal case, an inset 44 should include only designated regions of the panel 10, but as a practical matter it is sometimes convenient to include some non-designated areas within the insets, so as to simplify the process of gathering inset border data.

Referring to FIG. 5, an Index panel map 60 shows a considerably broader area than a regular panel 10, but at a lesser degree of detail, and usually without the flood zones being indicated thereon. Typically, an index panel 60 shows a broad geographic view of the locations of the various regular panels 10 that make up an entire community, or other large geographic area. It should be noted that, while FEMA "defines" communities, these FEMA defined communities often do not correspond to one's intuitive sense of what a community is.

The index panel 60, generally depicted in FIG. 5, provides its broader, less detailed overview by displaying an "outlines" of regular panels 10, that is, the neatline boundaries 32 of each of its regular panels 10 against a background of major geographic features (e.g. municipal boundaries, highways, lakes, etc.). The outlines of the regular panels 10 bear legends or labels informing of the corresponding designation of its regular map panel 10, as represented by "XX," "YY" and "ZZ" in FIG. 4. The designations "XX," etc. are set forth on the panels 10 outside the neatlines 32. Index maps 60, in effect, show how to "put together" the panel map 10 "jigsaw", that is, how to associate panel maps 10 with each other to form a grid thereof, grid lines 62 thereof being comprised of the aligned and/or overlapping neatlines 32 of adjacent panels 10.

Until the advent of the present invention, the primary purpose of the index maps 60 has been their use as an aid in manually determining which of the panel maps 10 should be consulted in order to make a flood zone determination. For example, if a property is known to be located in Community A, then a map analyst might first locate the property on the Community A index map 60. The analyst could immediately determine—by examining the neatline borders 32,62 and the labels "XX," "YY" "ZZ" displayed on the index map 60—which regular panel map 10 to consult. Since there are hundreds of panel maps 10 in the index map 60 of various communities, identification of a particular panel map 10 by examining an index map 60 can be effected more quickly than serially examining large numbers of panel maps 10. The present invention provides other, much more efficient ways of determining the correct regular panel map 10 applicable to a particular location.

Index maps 60 also contain neatline borders 32 for panel maps 10 that are not printed as such, and which are designated "panel not printed" or "PNP." As this name suggests, no actual panel map 10 is ever printed for a PNP. Instead, the relevant index map 60 displays the flood zone classification for the region contained within the PNP neatline borders 32. Accordingly, in the case of a PNP, the flood zone classification is determined from the index map 60, rather than from a regular panel 10.

In addition to the foregoing techniques, flood zone determinations can also be made on the basis of FEMA's denoting certain communities as "flood zone designated communities." In this event, FEMA mandates that a denoted community have the same flood zone classification throughout. As a consequence FEMA does not publish any flood panels—either regular 10 or index 60—for the community. A property located anywhere in that community assumes the flood zone classification of the community.

Digital Raster Maps

A digital raster map image may be thought of as a number of points selectively present at each X, Y coordinate of a Cartesian display. These points are usually called "pixels." Besides having an address at an X, Y location, a pixel may have a "value," usually a numeric quantity designating a specified color or grey-scale value for the pixel. The X, Y location and value of each pixel is data that may be stored. A digital raster map may be created by optically, digitally scanning a conventional paper map and thereafter using a computer system to define and/or display it in terms of its pixel locations and color values. Commonly used formats for storing scanned images currently include TIFF, JPEG, and PNG. Any FEMA regular panel 10 or index panel 60 may be represented as a digital raster map.

Digital Vector Maps

A vector map may be viewed as a "virtual" map that comprises, in effect, a collection of stored data. The stored data define the locations of plural nodes and plural straight-line segments interconnecting the nodes. The stored data defining a vector map represents geographic information in the form of collections of points—the nodes—and line segments interconnecting the nodes to form polygons, i.e., closed figures comprised of line-interconnected nodes. These points, lines, and polygons may have additional information associated with them. For example, the stored data may indicate that a particular point or node is the location of the capitol building, or that a selected polygon describes the border of Lake Placid. The polygons are surrogates for, or representations of, the actual curvilinear configuration of various geographic features: streets, streams, lakes, cities, counties, etc. Typically, the features— nodes alone or two or more interconnected nodes—are presented in terms of latitude/longitude (or lat/lon) values. If this or another earth-referenced system is used to locate the nodes of the map, the map is said to be georeferenced. A visually sensible map may be "drawn" from the stored data In view of the fact that georeferencing of digital raster map images plays a key role in the present invention, the precise meaning of this term, for the purposes hereof and as used herein, Is set forth below, Georeferencing A raster map image is said to be "georeferenced" if there exists mathematical functions, f and g, such that one function can be used to convert the X, Y coordinates of the pixels describing the map image to corresponding latitude/longitude coordinates and the other function can be used to convert the latitude/longitude coordinates of the pixels of the image to their corresponding X, Y coordinates. In other words, f and g effect the following:

1. If (x, y) represents a pixel location on a digital raster map image, then f(x, y)=(Lon, Lat) represents the longitude and latitude of the corresponding physical location; and 2. If (Lon, Lat) represents a physical location that lies within the region covered by the map, then g(Lon, Lat)=(x, y) represents the point on the digital raster map image that corresponds to that longitude and latitude.

In the previous paragraph, (x, y) defines a point pursuant to the natural internal coordinate system of the raster map image. Most digital vector map images use longitude and latitude as their internal coordinate system. Accordingly, most digital vector maps can be considered to be trivially georeferenced per se. Most digital raster map Images use the pixels of its image as a kind of natural coordinate matrix. Such a raster map image is not inherently trivially georeferenced and requires the operation of a non-trivial georeferencing function to convert back and forth between coordinate systems.

Most FEMA maps do not contain any latitude/longitude information that would be useful in georeferencing their scanned raster image. Some recently FEMA-issued panels do show latitude/longitude values at certain points thereon, but such panels are in a distinct minority when considered in the context of the 100,000+ panels that FEMA currently provides.

Before real property is bought, sold, or insured, it is common practice to examine the property for the risk of flooding. This is commonly done by examining a map depicting the flood zone in which the property is located. The Federal Emergency Management Agency (FEMA) assigns flood zone classifications and publishes a library of tens of thousands of paper maps showing the various flood zones and their locations in the United States. A determination of whether a property resides in a flood zone and, if so, the classification of such flood zone has, until the advent of the present invention, been typically performed in the following manner.

First, the address of a selected parcel of real property is examined, and the location of the property is determined as a consequence thereof. This may be achieved, for example, through the use of a geocoding system, or by examining an available street map. Next, a map analyst attempts to determine which one(s) of the many thousands of FEMA flood maps contain or depict the location of the property. This determination may entail false starts, dead ends and misdirection and may occasionally require hours of effort before the identity of the flood map containing the property Is found. During this process the map analyst may retrieve, from map storage, and view numerous paper maps before determining the one containing the property's location.

Third, having retrieved the required paper map, the map analyst next determines where the property is located on the FEMA map. Finally, the map analyst examines flood zone notations on the map at the property's location in order to determine its flood zone status.

This foregoing manual process can be somewhat improved by scanning the paper FEMA maps into a computer to produce stored digital raster maps, which can be retrieved and viewed as necessary. A digital raster map is a map image that resembles a conventional paper map in that it presents an image of the mapped area, but has no additional underlying data associated with the features of the map. A raster map is typically created by scanning a conventional paper map, and is a grid-based map composed of pixels (or dots) of color or black and white. Each pixel in the grid can be referenced by Cartesian X. Y pixel coordinates, and has an associated value Indicating the color of the pixel. Raster images are commonly referred to as "bit mapped" images.

A vector map comprises polygons—nodes connected together with straight line segments—rather than pixels, to describe an image. Unlike a raster map, in which the map image is simply stored and displayed as a grid of pixels each having an X, Y coordinate, a vector map is drawn from a set of underlying data stored, for example, in a computer memory. A vector map is created through the placement of the nodes on a plane and the connection together of those nodes with straight-line segments. The nodes and lines may be attributed with stored tables of data such as elevations, values, names or other information. Vector data can be displayed in three dimensions if the lines are attributed with z values, modified or changed relative to user need, or layered to allow for turning off and on the viewing of different information.

Because of their feature attribution properties, vector maps are particularly useful for displaying geographic data on a computer system. Vector maps are used to display boundaries or lines that denote the position and extent of features, such as county boundaries or lines denoting stream and river systems. It is also very easy to view or manipulate the data underlying a vector map, for example to view or change the elevation of a feature.

Also, because vector maps are drawn from stored data which describe the locations of features shown, they are often inherently georeferenced. Georeferencing is the process of relating source coordinates to referenced geographic coordinates, which are typically in standard latitude/longitude. An image or a vector file is georeferenced to be used within a mapping/geographic environment. In a vector map, the data from which the map is drawn will typically already include a geographic coordinate set.

Modern GIS systems normally make use of digital vector based map information. However, a vast legacy of paper based map information exists. It is very expensive and time consuming to convert all of the information on these paper maps to a digital vector format. In many cases the scope and expense of such conversions render them completely impractical. However, even when a complete conversion to digital vector-based format is not feasible, it is still possible to obtain some of the benefits of computerized map systems by converting the paper maps to digital raster maps (by scanning them), followed by georeferencing the raster images. After georeferencing, there is a clear relationship between the X, Y coordinates of each pixel in the raster map, and the geographic—latitude, longitude—coordinates of each pixel.

Since flood zone determinations are typically performed using paper FEMA maps, It would be desirable to provide a system and method for performing flood zone certifications that is faster and can be performed less expensively than the process described above.

SUMMARY OF THE INVENTION

It is, therefore one object of the present invention to provide an improved system and method for analyzing geographic traits and characteristics. It is another object of the present invention to provide an improved system and method for performing flood zone determinations. However, it should be understood that the present invention relates to analyzing any geographic, ecological, climatological or other trait that Is described or indicated on a geographic map, as by shading, coloring or otherwise highlighting various portions of the map to indicate the presence, absence or magnitude of the trait.

The foregoing objects are achieved In the following general manner. The present invention provides a system and method for performing flood zone determinations or assessments of other traits of selected geographic areas using scanned, digital raster map images of originally non-georeferenced maps—in the case of flood zone determinations, these are FEMA paper maps that have been georeferenced. Such georeferencing is preferably effected according to the invention of the above-noted commonly assigned '849 application and the CIP application based thereon, but any method that imparts latitude and longitude coordinates to the pixels of the raster map may be used.

To determine the flood zone classification or to assess another trait of a particular property, a user first enters the street address or full legal address of the property into a data processing system. The system determines from the address, possibly with user intervention, the latitude and longitude of the property location. The system then determines which georeferenced raster map or maps include or may induce that address and the particular property designated thereby. Specifically, if the system identifies a single georeferenced raster map as the only map on which the address appears, that georeferenced raster map is retrieved and utilized to generate a flood zone certificate for the property. If, as is possible, the system identifies two or more georeferenced raster maps as containing, or as likely to contain, the address, a "Short list" of possible georeferenced raster maps is ultimately produced. It is then determined which of several georeferenced raster maps on the short list contains the property. After there Is identified the one georeferenced raster map that both contains the property and is property usable to determine flood zone classifications for the property, the user examines the flood zone or other data thereon. Alternatively, the system can compare the geographic coordinates of the property against a database of flood zone boundaries for an automated flood zone determination. The system can also generate, store, and produce flood zone certificates according to the flood zone determination.

More specifically, the present invention relies on the availability of a complete set of scanned and georeferenced images of all extant FEMA maps in raster format and the storage of the FEMA maps and the respective georeferencing functions correlating their pixels' coordinates to the lat/lon coordinate system of a stored vector map. Georeferencing FEMA paper maps is covered in commonly assigned, co-pending '849 application and in the CIP based thereon. Preferably, the user also has the ability to synchronize the display of the FEMA map with any other georeferenced map, such as the vector map, as set forth in the commonly assigned, co-pending '162 application and in the CIP based thereon. The '849 application and its related CIP application provide for the generation and fine tuning of a georeferencing function which mathematically relates each pixel of an ungeoreferenced raster map, showing flood zone classifications, to the latitude, longitude coordinates of its corresponding geographic location.

DETAILED DESCRIPTION

The present invention provides, inter alia, for determining the flood zone classification of specific real property as described hereafter.

Before the system is used to determine the flood zone classification of a particular property—or to assess some other trait present at or associated with the property—a virtual grid of rectangular regions is defined. The virtual grid covers a geographic region that contains all of the geographic area contained on the FEMA maps or other maps conveying information related to geographic areas. Each of these grid-rectangles is defined to be the set of all locations with latitude between specified lower and upper bounds, and longitude between specified lower and upper bounds. For example, one grid-rectangle might be the set of all (latitude, longitude) satisfying 35.1<=latitude<35.2 and 93.5<=longitude<93.6. For each grid-rectangle whose area intersects the area covered by some inset on a FEMA or other trait-indicating map, a list of all such intersecting insets is created.

It should be recognized that initially "attaching to" or associating with each first grid rectangle a list of all the insets with which it intersects substantially shortens the time it takes to search for the Inset containing the property of Interest Specifically, because of the simple nature of the virtual first grid system, it is quite easy to calculate which grid rectangle contains a specified property. And, if the first grid rectangle containing the property has attached thereto a list of the insets which intersect the grid rectangle, a fortiori, if the property intersects a flood map inset, that inset is one of the insets contained on the list attached to the first grid rectangle. In effect, then, the insets on the grid rectangle's list constitute a "long list" that is a list of all insets that possibly contain the property. The long list is quite limited, compared to the total number of insets derived from FEMA or other maps, and selecting a "short list" or "the" inset becomes quite expedient.

Figure 7:
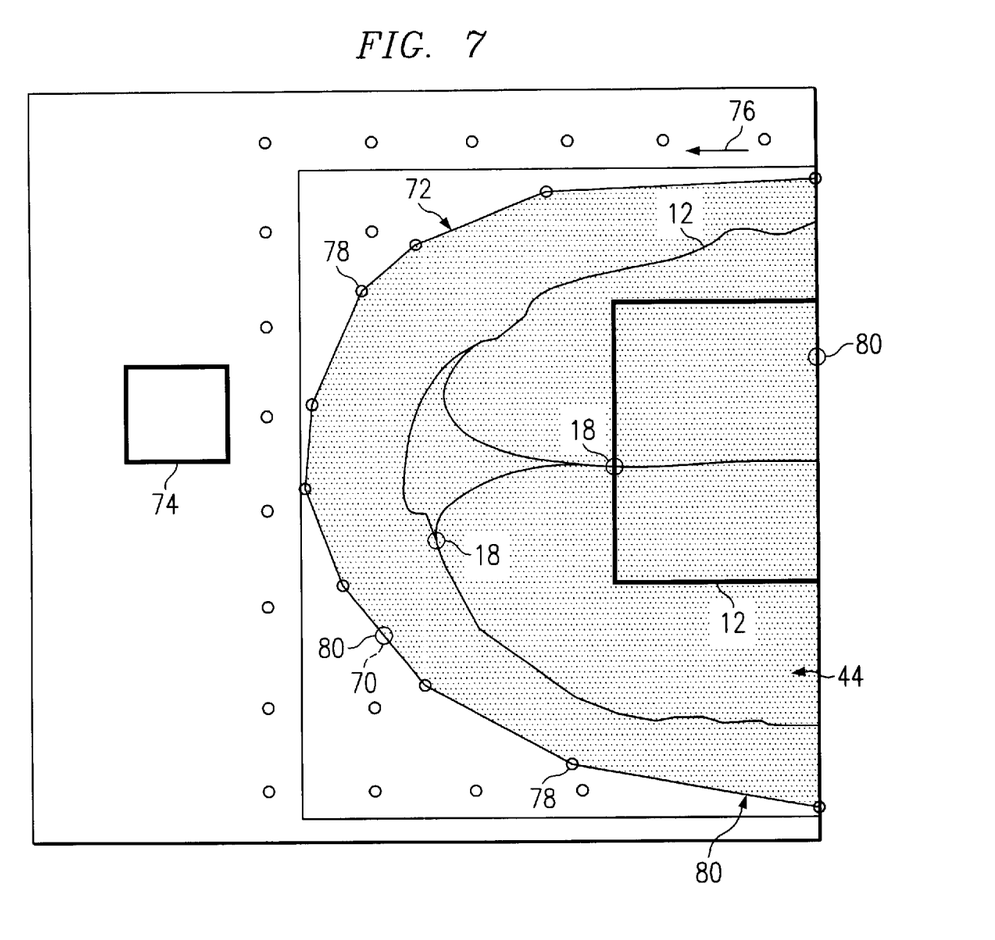

Referring to FIG. 7, the procedures for achieving the foregoing are set forth.

A "bounding box" 70 is calculated or constructed for each inset polygon 72 generated during the georeferencing procedures of the '849 application. As used herein, a bounding box 70 is the set of geographic locations, (latitude, longitude), defined by {Minimum latitude of inset 72}<= latitude<{Maximum latitude of inset 72} and {Minimum longitude of inset 72}<=longitude<{Maximum longitude of Inset 72}. Put another way, it is the smallest imaginary or virtual rectilinear quadrilateral that can be drawn or constructed to just contain an irregular polygon 72 with the sides of the quadrilateral having either a North-South or East-West orientation Using the bounding box 70 as a "polygon," a determination is made of all first grid-rectangles 74 that are overlapped or intersected thereby. Each overlap or intersection, indicated by large dots in FIG. 7, denotes a grid rectangle 74 that might overlap, or be overlapped by, an inset polygon 72. (Note that in FIG. 7 the inset 44 does not actually Intersect some of the dotted grid rectangles 74.)

A second virtual grid is defined, the members of which are those first grid rectangles 74 that are intersected by the bounding box 70 and, therefore, might be intersected by the bounding box's inset 44. Initially mark or denote these grid rectangles 74 initially in the second grid as "not processed."

As shown by the arrow 76 in FIG. 7, serially traverse the border or boundary of the inset polygon 72—the nodes or vertices 78 and straight line segments 80. (The inset polygon 72 was generated when the FEMA maps 10 and 60 were georeferenced, as set forth in the '849 application and the CIP application based thereon.) As each line segment 80 of the inset polygon 72 is traversed, it is determined which grid rectangles 74 of the second grid are intersected by the segment 80. If both endpoints 78 of the segment 80 lie within a single grid-rectangle 74 this determination Is straightforward. If the endpoints 78 lie within different grid-rectangles 74, then the set of all intersecting grid rectangles 74 can be determined by examining the points where the segment 80 crosses grid rectangle borders. Each border crossing represents a traversal path from one second grid rectangle 74 into an adjacent second grid rectangle 74.

If, during traversal of the inset polygon 72, one or more of the segments 80 is found to intersect a particular second grid rectangle 74, then there is intersection between the second grid rectangle 74 and the inset polygon 72. If no such intersecting segment 80 is found, then either the second grid rectangle 74 is surrounded by and entirely within the inset polygon 72—there is intersection—or the second grid rectangle 74 is wholly outside the inset polygon 72, and there is no Intersection.

If, during traversal of the inset polygon 72, one or more of the segments 80 is found to intersect a particular second grid rectangle 74, then the inset 72 is added to the list of insets 72 that Intersect that second grid rectangle 74 (If it is not already on that list). Any such grid rectangle 74 is now denoted as "border" and "processed."

For each second grid rectangle 74 that remains "not processed" proceed as follows:

(i) Calculate the center point of the grid rectangle 74;

(ii) Use a point-in-polygon algorithm to determine if the center point is contained within the inset polygon 72;

(iii) If the center point Is contained within the inset polygon 72, then the entire grid rectangle 74 must be contained within the inset polygon 72. The inset 44 is added to the list for the grid rectangle 74, and the grid rectangle 74 is marked "Inside" (but still "not processed.") Now iteratively apply the rule that any "not processed" grid-rectangle 74 that is adjacent to a grid-rectangle 74 marked "inside", must also be entirely inside the inset polygon 72, and should therefore also be denoted as "Inside." When this rule has been applied to all neighbors of a particular "not processed," "inside" grid-rectangle, then it should be marked as "processed;"

(iv) If the center point is not contained within the inset 44, as determined by a point-in-polygon procedure, the entire second grid-rectangle 74 must be wholly outside the inset. The inset 44 is not added to the grid rectangle's list and the grid rectangle 74 is marked "outside," (but still "not processed.") Now iteratively apply the rule that any "not processed" grid-rectangle 74 that is adjacent to a grid-rectangle 74 marked "outside", must also be entirely outside the inset polygon 72, and should therefore also be denoted as "outside," When this rule has been applied to all neighbors of a particular "not processed," "outside" grid-rectangle 74, then it should be marked as "processed."

(v) Repeat the procedure for remaining "not processed" grid-rectangles.

Thus, the system and method of the present invention begin with the georeferencing method and system of the '849 application and the CIP application based thereon and perform an initial step of creating a list for each rectangle grid. Each list contains and identifies all FEMA insets that intersect the list's grid rectangle 74. The location of real property, expressed in latitude, longitude can be associated with the grid rectangle that contains it, which, In turn associates it with a short list of all possible Insets that could contain the property. Various methods may be used to quickly examine the short list and determine which inset is the flood control map applicable to the property.

When a customer submits the location of the property on which a flood—or other—determination is to be made, the submission may take several forms, Often the location is given by providing the property's street address. Sometimes a legal address is given, which may contain a "metes and bounds" description; sometimes the customer provides the latitude and longitude coordinates of the property. The customer request for a flood determination and the accompanying location information forms the basis for creating a work order which is stored on the computer system.

From a work order, the latitude, longitude coordinates ("lat/lon") of the property must be determined. As noted above, the customer may sometimes provide this information directly, thus eliminating the need for further effort. Generally, however, the address (street, legal, or other) must be converted into lat/lon. This conversion is called "geocoding." Once geocoding has been performed—the lat/lon coordinates have been determined—the lat/lon are recorded on the computer system along with other work order data. Common methods for geocoding, include, but are not limited to:

(a) Automatic methods, including
  (i) Commercial "scrubbing and geocoding" software, which usually returns the lat/lon coordinates of a street address.
  (ii) A database of locations specified by legal address.

(b) Methods requiring human intervention
  (i) A paper map, plat map, web site, telephone call to a responsible agency, or other means is used to locate the property, based on whatever location information is provided. Thereafter, the property's location is designated on a georeferenced map, which through its georeferencing implies the appropriate lat/lon coordinates.
  (ii) In one embodiment of the present invention, the person "clicks" the mouse cursor on the property's location as displayed on a digital vector street map image licensed from a commercial source.

There must be selected the appropriate FEMA flood map image from which the flood zone classification of the property can be made. More specifically, the system determines which inset 72 on which flood map image 10—both of which have been georeferenced, preferably by the method of the '849 application and the resulting CIP application—should be used to make the flood determination for the property. There are a very large number of insets contained in 100,000+FEMA flood maps. Accordingly, the final choice of the proper inset is made in two stages The first stage (a) is automatically accomplished by the computer system, while the second stage (b) may require human intervention.

(a) Automatically create a "long list" of possible insets which may include the property. This process is described above, and involves the explication of the virtual first grid of rectangles, expressed in lat/lon coordinates, which covers a geographic region that contains all flood map image insets. In specific implementations of the present invention, the grid has 20,000 lines in the North-South direction, and 40,000 lines in the East-West direction and covers the entire globe, which results in grid-rectangles of approximately 1 kilometer square at the equator (and smaller elsewhere). Due to the simple nature of this first grid structure, it is a simple matter to calculate which first and rectangle contains any given point. It is also simple to determine which grid rectangles contain any part of a given great curve connecting two points of given latitude and longitude.

Geocoding the address of the property, permits the determination of the selected first grid-rectangle that contains the property. Selection of the first grid-rectangle permits access to its long list of intersecting insets. If the property is located on any Inset, then it must be one of the insets in this list.

(b) Point-in-polygon testing of the property with respect to each polygon in the long list is performed to determine which panel map insets 44 contain the property. This list of Insets in called the "short list." The borders of each inset in the short list are displayed on the system. This display and associated information on the insets are used by the user to determine which is the single inset 44 (and therefore panel 10) from which the property's flood zone classification may be determined. The user determines the flood zone classification of the property from the appropriate panel map. The user will also note the specific community and/or county containing the property, when more than one possibility exists. Additional related information—community status, panel effective date, insurance availability, community number, lender ID number, and useful property-locating data can be determined using a database of flood information. Note that a purely automated system for completing Flood Hazard Determinations (no human intervention) can first be tried, and the job need only be passed to this system in the event of the failure of the purely automated system.

Figure 9:
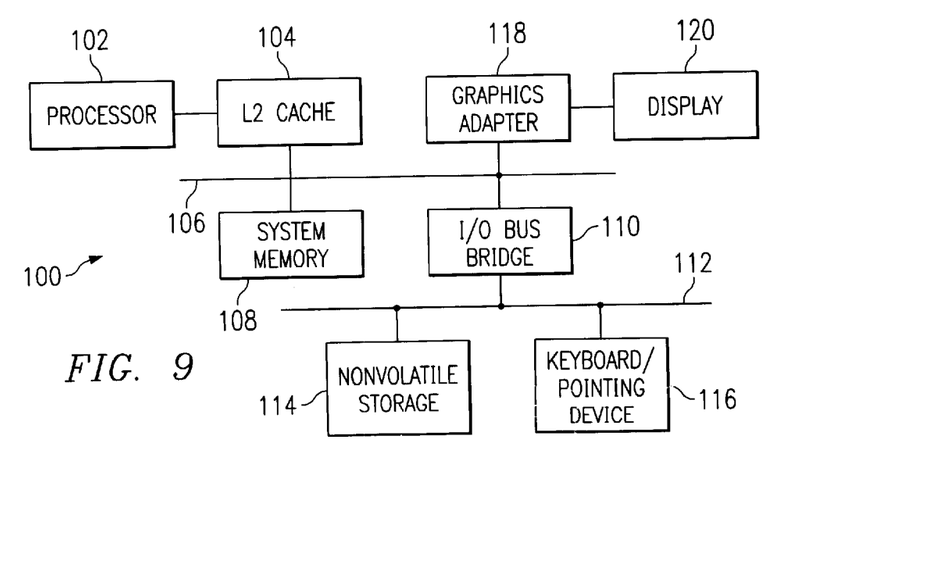
FIG. 9 is a generalized view of a computer system for effecting the present invention.

With reference to FIG. 9, a block diagram of a data processing system in which the present invention may be implemented is depicted. Data processing system 100 includes processor 102 and associated L2 Cache 104, which in the exemplary embodiment is connected in turn to a system bus 106. System memory 108 is connected to system bus 106, and may be read from and written to by processor 102.

Also connected to system bus 106 is I/O bus bridge 110. In the exemplary embodiment, data processing system 100 includes graphics adapter 118 connected to bus 106, receiving user interface information for display 120. Peripheral devices such as nonvolatile storage 114, which may be a hard disk drive, and keyboard/pointing device 116, which may include a conventional mouse, a trackball, or the like, are connected to 110 bus 112.

The exemplary embodiment shown in FIG. 9 is provided solely for the purposes of explaining the invention and those skilled in the art will recognize that numerous variations are possible, both in form and function. For instance, data processing system 100 might also include a compact disk read-only memory (CD-ROM) or digital video disk (DVD) drive, a sound card and audio speakers, and numerous other optional components. All such variations are believed to be within the spirit and scope of the present invention. Data processing system 100 is provided solely as an example for the purposes of explanation and is not intended to imply architectural limitations.

The data processing system described above can also include one or more image scanners, to convert a map from paper format to a digital raster map.

The preferred embodiment provides a system and method for performing flood zone determinations using scanned, georeferenced, digital raster map images. The user, to determine the flood zone classification of a particular property, first enters the ret address, or full legal address, into a data processing system. The system determines, from the address, which raster map includes that particular property. The system retrieves that map, and utilizes georeferencing information to locate the property on the raster map. The user can visually verify the location of the property as marked on the displayed raster map; and can at that point examine the flood zone indications on the raster map. The system can also generate, store, and produce flood zone certificates according to the flood zone determination.

The georeferencing of the non-georeferenced FEMA maps is described in the '849 application A digital map image is considered georeferenced if a pair of mathematical functions, f, and g, have been defined that can be used to convert back and forth between the coordinates of the map image (as defined by the pixels of the image) and the corresponding longitude and latitude of the location of that point.

1. If (x, y) represents a location on the digital map image, then f(x, y)=(Lon, Lat) represents the longitude and latitude of the corresponding physical location.
2. If (Lon, Lat) represents a physical location that lies within the region covered by the map, then g(Lon, Lat)=(x, y) represents the point on the digital map image that corresponds to that longitude and latitude.

Here, x and y represent the natural internal coordinate system of the map image. Typically, as described above, a digital raster map image uses the pixels of its image as a natural coordinate matrix. However, in most cases, a vector-based map image uses longitude and latitude as its internal coordinate system; if so, it can be considered to be trivially georeferenced already. Therefore the functions f ( ) and g ( ) above are non-trivial georeferencing functions required to convert back and forth between coordinate systems.

Figure 8A:
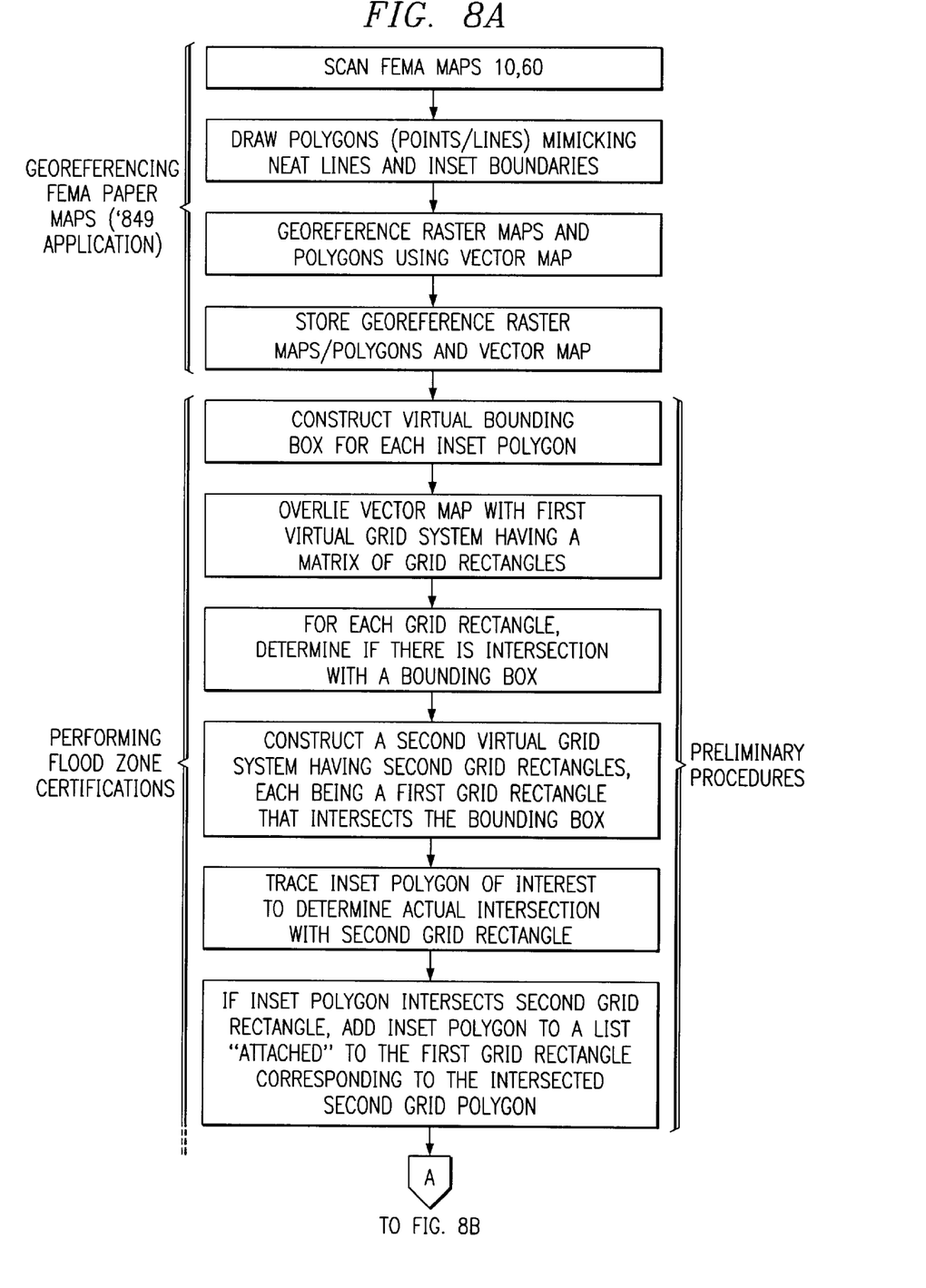
FIG. 8 is a flow chart of a process in accordance with a preferred embodiment of the present Invention.
Figure 8B:
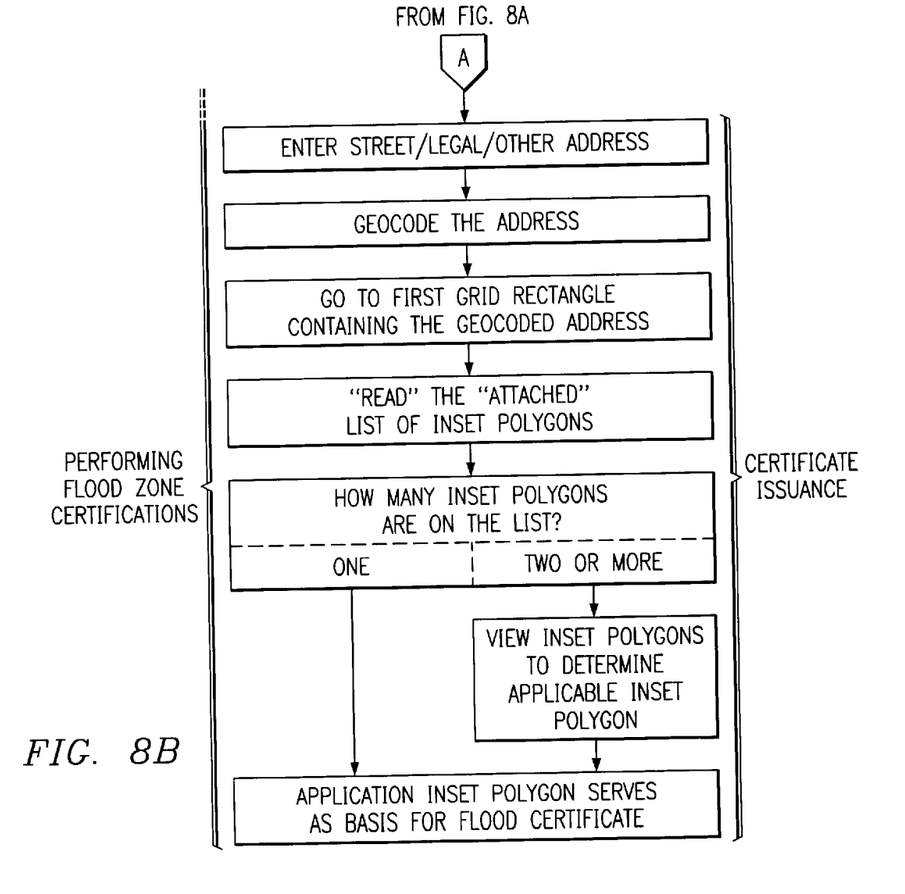

Once the raster map Images of the preferred embodiment are georeferenced, the system can easily locate specific geographic locations thereon. This is important, because, as discussed above, each rectangle of the virtual grid ultimately has associated therewith a list of all map Insets that intersect it. Thus, when a specific geocoded location is entered, the grid rectangle containing the address is immediately locatable. If a single inset is on the rectangle's list, it is that very inset and its panel map that exclusively contain the sought after flood zone information. If, on the other hand, the list contains two or more insets, the procedures described earlier lead to a determination of which is the only appropriate Inset and associated panel map by which to evaluate the location. FIG. 8 is a process chart showing the steps involved in the method of the present invention, as set forth immediately above and earlier in this description.

While the process of the preferred embodiment has assumed that the required paper map has been previously georeferenced, it is also possible that the property in question is only found on a traditional paper map. If this is the case, the user may scan the paper map into the data processing system to create a raster map image. The image may then be georeferenced to provide georeferencing functions for converting between the raster map image coordinates and the geographic coordinates. Once this has been done, the process of the preferred embodiment can be performed as described above.

It is important to note that while the present invention has been described in the context of a fully functional data processing system and/or network, those skilled in the art will appreciate that the mechanism of the present Invention is capable of being distributed in the form of a computer usable medium of instructions in a variety of forms, and that the present invention applies equally, regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A computer-implemented method of evaluating a characteristic or trait present at and in the vicinity of a geographic location from plural, initially non-georeferenced maps that depict the characteristic or trait being evaluated and other related data and that have been georeferenced, which comprises:

(a) constructing a virtual bounding box around each inset of the maps;

(b) defining a virtual rectangular geographic grid system covering the total area covered by the maps;

(c) for each grid rectangle that intersects an inset bounding box, tracing the inset enclosed by the bounding box to determine if there is intersection of the grid rectangle and the inset;

(d) if there is Intersection of the grid rectangle and the inset, adding the identity of the inset to a list associated with the grid rectangle;

(e) geocoding the location of the geographic location; and (f) examining the insets contained in the list associated with the one grid rectangle containing the geocoded location and, using the data thereon, performing the evaluation.

2. A method as in claim 1, wherein:

step (f) includes examining insets contained in the lists associated with grid rectangles that do not contain the geocoded location but abut and are proximate the one grid rectangle containing the geocoded location.

3. A method as in claim 1, wherein:

the data for performing the evaluation is properly obtainable only from one of the maps, which method further comprises:

(f$_1$) examining the list of insets contained on the list associated with the grid rectangle containing the geocoded location; and (i) if there is only one inset on the list, using the data on its map to complete the evaluation, or (ii) if there is more than one inset on the list, inspecting their respective insets to determine which inset-containing map is appropriate and using the data on that one map to complete the evaluation.

4. A method as in claim 3, wherein:

the characteristic or trait is a geographic, demographic, ecological or climatological trait.

5. A computer-implemented method of performing trait evaluations for real property using plural, initially non-georeferenced flood maps, comprising:

(a) forming a raster image of each flood map;

(b) constructing polygons enclosing each inset of the flood maps;

(c) georeferencing the flood maps by the use of another georeferenced map that depicts the same geographic area as the flood maps;

(d) constructing a bounding box around each inset polygon;

(e) defining a virtual rectangular geographic grid system;

(f) for each grid rectangle that intersects an inset bounding box, tracing the inset enclosed by the bounding box to determine if there is intersection of the grid rectangle and the inset;

(g) if there is intersection of the grid rectangle and the inset, adding the identity of the inset to a list associated with the grid rectangle;

(h) geocoding the location of the geographic location; and (i) examining the insets contained in the list associated with the one grid rectangle containing the geocoded location and, using the data thereon, performing the evaluation.

6. A method as in claim 5, wherein:

the flood maps are FEMA paper maps.

7. A method as In claim 5, wherein:

the characteristic or trait is a geographic, demographic, ecological or climatological trait.

8. A computer system for evaluating a characteristic of a geographic location from plural, initially non-georeferenced maps that depict the characteristic being evaluated and other related data, the maps having been georeferenced, which comprises:

(a) first facilities including a pointing device for constructing a virtual bounding box around each inset of the maps;

(b) second facilities for determining each grid rectangle that intersects a bounding box and for tracing the inset enclosed by the bounding box to determine if there is intersection of the grid rectangle and the inset;

(c) third facilities for determining whether there is intersection of a grid rectangle and an inset, and, if there is, for adding the identity of the inset to a list associated with the grid rectangle;

(d) fourth facilities for geocoding the location of the geographic area; and (e) fifth facilities for examining the list of insets contained on the list associated with the grid rectangles containing the geocoded location and those grid rectangles proximate there, and, using the data thereon, for performing the evaluation.

9. A system as in claim 8, wherein:

the characteristic or trait is a geographic, demographic, ecological or climatological trait.

10. A system as in claim 8, wherein:

the data for performing the evaluation is properly obtainable from only one of the maps, and wherein:

(f$_1$) the fifth facilities perform so that if there is only one inset on the list, the data on its map is used to complete the evaluation, or, if there is more than one inset on the list, their respective insets are inspected to determine which inset-containing map is appropriate and the data on that one map is used to complete the evaluation.

11. A system as in claim 10, wherein:

the map is a raster map based on x,y coordinates, the georeferencing of the map being achieved by calculating a georeferencing function f(x,y)=(latitude, longitude) and a georeferencing function g(lat,lon)=(x, y), the georeferencing functions being stored by the computer system.

12. A computer system for performing flood zone certifications for real property using plural, initially non-georeferenced flood maps, comprising:

(a) a scanner for forming a raster image of each flood map;

(b) a pointing device for constructing polygons enclosing each inset of the flood maps;

(c) first facilities for georeferencing the flood maps by the use of a georeferenced map that depicts the same geographic area as the flood maps;

(d) a pointing device for constructing a bounding box around each polygon;

(e) second facilities virtually overlaying the vector map with a virtual grid system defined by grid rectangles;

(f) third facilities for determining each grid rectangle that intersects a bounding box of an inset, and, if it does, for tracing the inset polygon enclosed by the bounding box to determine if there is intersection of the grid rectangle and the inset polygon;

(g) fourth facilities for determining whether there is intersection of a grid rectangle and an inset polygon, and, if there is, for adding the identity of the inset polygon to a list associated with the grid rectangle;

(h) fifth facilities for geocoding the address of the property; and (j) sixth facilities for examining the list of inset polygons contained on the list associated with the grid rectangle containing the geocoded address; and (k1) if there is only one polygon on the list, for using the data on its flood map to complete the flood zone certification, and (k2) if there is more than one polygon on the list, for inspecting the polygons to determine which polygon-containing flood map is appropriate and for using the data on that one flood map to complete the flood zone certification.

13. A system as in claim 12, wherein:

the flood maps are FEMA paper maps.

14. A system as in claim 13, wherein:

the raster map images of the FEMA flood maps are based on x,y coordinates, the georeferencing of the flood maps being achieved by calculating a georeferencing function f(x,y)=(latitude,longitude) and a georeferencing function g(lat,lon)=(x,y), the georeferencing functions being stored by the computer system.

15. A computer-implemented method of preparing plural, initially non-georeferenced maps that depict a characteristic or trait at and near a geographic location so as to be usable for evaluating the characteristic or trait at the location, the maps having been georeferenced, which method comprises:

(a) constructing a virtual bounding box around each inset of the maps;

(b) defining a virtual grid of identical rectangles corresponding to the total area covered by the maps;

(c) for each grid rectangle that intersects a bounding box, tracing the inset enclosed by the bounding box to determine if there is intersection of the grid rectangle and the inset; and (d) if there is intersection of a grid rectangle and an inset, adding the identity of the inset to a list associated with the grid rectangle, so that thereafter, when the location is geocoded and the list of insets associated with the grid rectangle containing the geocoded location is examined, data on such insets permits the evaluation to be effected.

16. A computer-readable medium containing instructions executable by a computer to prepare plural, initially non-georeferenced maps that depict a characteristic or trait at and near a geographic location so as to be usable for evaluating the characteristic or trait at the location, the maps having been georeferenced, the method comprising:

(a) constructing a virtual bounding box around each inset of the maps;

(b) defining a virtual grid of identical rectangles corresponding to the total area covered by the maps;

(c) for each grid rectangle that intersects a bounding box, tracing the inset enclosed by the bounding box to determine if there is intersection of the grid rectangle and the inset; and (d) if there is intersection of the grid rectangle and the inset, adding the identity of the inset to a list associated with the grid rectangle, so that thereafter, when the location is geocoded and the list of insets associated with the grid rectangle containing the geocoded location is examined, data on such insets permits the evaluation to be effected.

17. The computer-readable medium of claim 16 wherein the computer-readable medium is a data transmission medium transmitting a generated data signal containing the instructions.

18. A computer-readable medium containing instructions executable by a computer to evaluate a characteristic or trait present at and in the vicinity of a geographic location from plural, initially non-georeferenced maps that depict the characteristic or trait being evaluated and other related data that have been georeferenced, the method comprising:

(a) constructing a virtual bounding box around each inset of the maps;

(b) defining a virtual rectangular geographic grid system covering the total area covered by the maps;

(c) for each grid rectangle that intersects an inset bounding box, tracing the inset enclosed by the bounding box to determine if there is intersection of the grid rectangle and the inset;

(d) if there is intersection of the grid rectangle and the inset, adding the identity of the inset to a list associated with the grid rectangle;

(e) geocoding the location of the geographic location; and (f) examining the insets contained in the list associated with the one grid rectangle containing the geocoded location and, using the data thereon, performing the evaluation.

19. A computer-readable medium containing instructions executable by a computer to perform trait evaluations for real property using plural, initially non-georeferenced flood maps, the method comprising:

(a) forming a raster image of each flood map;

(b) constructing polygons enclosing each inset of the flood maps;

(c) georeferencing the flood maps by the use of another georeferenced map that depicts the same geographic area as the flood maps;

(d) constructing a bounding box around each inset polygon;

(e) defining a virtual rectangular geographic grid system;

(f) for each grid rectangle that intersects an inset bounding box, tracing the inset enclosed by the bounding box to determine if there is intersection of the grid rectangle and the inset;

(g) if there is intersection of the grid rectangle and the inset, adding the identity of the inset to a list associated with the grid rectangle;

(h) geocoding the location of the geographic location; and (i) examining the insets contained in the list associated with the one grid rectangle containing the geocoded location, and, using the data thereon, performing the evaluation.

20. The computer-readable medium of claim 18 wherein the computer-readable medium is a data transmission medium transmitting a generated data signal containing the instructions.

21. The computer-readable medium of claim 19 wherein the computer-readable medium is a data transmission medium transmitting a generated data signal containing the instructions.

* * * * *

UNITED STATES PATENT AND TRADEMARK OFFICE
CERTIFICATE OF CORRECTION

PATENT NO. : 6,678,615 B2  
DATED : January 13, 2003  
INVENTOR(S) : John Willard Howard et al.

It is certified that error appears in the above-identified patent and that said Letters Patent is hereby corrected as shown below:

Title page,
Item [75], Inventor, the third listed inventor's address should read
-- Forth Worth, TX --;

Column 13,
Line 5, "Intersection" should read -- intersection --;
Line 63, "In" should read -- in --;

Column 15,
Line 37, "a grid rectangle and an" should read -- the grid rectangle and the --.

Signed and Sealed this

Sixth Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,678,615 B2  Page 1 of 1
DATED : January 13, 2003
INVENTOR(S) : John Willard Howard et al.

It is certified that error appears in the above-identified patent and that said Letters Patent is hereby corrected as shown below:

<u>Title page,</u>
Item [75], Inventor, the third listed inventor's address should read
-- Fort Worth, TX --;

<u>Column 13,</u>
Line 5, "Intersection" should read -- intersection --;
Line 63, "In" should read -- in --;

<u>Column 15,</u>
Line 37, "a grid rectangle and an" should read -- the grid rectangle and the --.

This certificate supersedes Certificate of Correction issued July 6, 2004

Signed and Sealed this

Sixteenth Day of November, 2004

JON W. DUDAS
*Director of the United States Patent and Trademark Office*